(12) United States Patent
Heyrman et al.

(10) Patent No.: US 7,222,343 B2
(45) Date of Patent: May 22, 2007

(54) DYNAMIC ALLOCATION OF COMPUTER RESOURCES BASED ON THREAD TYPE

(75) Inventors: Peter Joseph Heyrman, Rochester, MN (US); Karl Robert Huppler, Mantorville, MN (US); Henry Joseph May, Mantorville, MN (US); Kenneth Charles Vossen, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 10/346,147

(22) Filed: Jan. 16, 2003

(65) Prior Publication Data

US 2004/0143833 A1 Jul. 22, 2004

(51) Int. Cl.
*G06F 9/46* (2006.01)
(52) U.S. Cl. ........................... 718/100; 718/104
(58) Field of Classification Search ............. 718/100, 718/102, 104
See application file for complete search history.

(56) References Cited

U.S. PATENT DOCUMENTS 5,838,968 A * 11/1998 Culbert ................... 718/104
6,298,370 B1 * 10/2001 Tang et al. ............... 718/102
2003/0163509 A1 * 8/2003 McKean et al. ........... 709/100

FOREIGN PATENT DOCUMENTS

| EP | 0 817 044 A2 | 1/1998 |
|---|---|---|
| JP | 03-113563 | 5/1991 |
| JP | 11-259318 | 9/1999 |

* cited by examiner

*Primary Examiner*—Thomas Lee
*Assistant Examiner*—Kenneth Tang
(74) *Attorney, Agent, or Firm*—Wood, Herron & Evans, LLP (57) ABSTRACT

An apparatus, program product and method dynamically assign threads to computer resources in a multithreaded computer including a plurality of physical subsystems based upon specific "types" associated with such threads. In particular, thread types are allocated resources that are resident within the same physical subsystem in a computer, such that newly created threads and/or reactivated threads of those particular thread types are dynamically assigned to the resources allocated to their respective thread types. As such, those threads sharing the same type are generally assigned to computer resources that are resident within the same physical subsystem of a computer, which often reduces cross traffic between multiple physical subsystems resident in a computer, and thus improves overall system performance.

24 Claims, 3 Drawing Sheets

DYNAMIC ALLOCATION OF COMPUTER RESOURCES BASED ON THREAD TYPE

FIELD OF THE INVENTION

The invention relates to computers and computer software, and in particular, to the allocation of computer resources in a multithreaded computer.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a software standpoint, multithreaded operating systems and kernels have been developed, which permit computer programs to concurrently execute in multiple "threads" so that multiple tasks can essentially be performed at the same time. Threads generally represent independent paths of execution for a program. For example, for an e-commerce computer application, different threads might be assigned to different customers so that each customer's specific e-commerce transaction is handled in a separate thread.

From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors.

A significant bottleneck that can occur in a multi-processor computer, however, is associated with the transfer of data to and from each microprocessor, often referred to as communication cost. Most computers rely on a main memory that serves as the principal working storage for the computer. Retrieving data from a main memory, and storing data back into a main memory, however, is often required to be performed at a significantly slower rate than the rate at which data is transferred internally within a microprocessor. Often, intermediate buffers known as caches are utilized to temporarily store data from a main memory when that data is being used by a microprocessor. These caches are often smaller in size, but significantly faster, than the main memory. Caches often take advantage of the temporal and spatial locality of data, and as a result, often significantly reduce the number of comparatively-slower main memory accesses occurring in a computer and decrease the overall communication cost experienced by the computer.

Often, all of the microprocessors in a computer will share the same main memory, an architecture that is often referred to as Symmetric Multiprocessing (SMP). One limitation of such computers, however, occurs as a result of the typical requirement that all communications between the microprocessors and the main memory occur over a common bus or interconnect. As the number of microprocessors in a computer increases, the communication traffic to the main memory becomes a bottleneck on system performance, irrespective of the use of intermediate caches.

To address this potential bottleneck, a number of computer designs rely on Non-Uniform Memory Access (NUMA), whereby multiple main memories are essentially distributed across a computer and physically grouped with sets of microprocessors and caches into physical subsystems or modules. The microprocessors, caches and memory in each physical subsystem of a NUMA computer are typically mounted to the same circuit board or card to provide relatively high speed interaction between all of the components that are "local" to a physical subsystem. The physical subsystems are also coupled to one another over a network such as a system bus or a collection of point-to-point interconnects, thereby permitting microprocessors in one physical subsystem to access data stored in another physical subsystem, thus effectively extending the overall capacity of the computer. Memory access, however, is referred to as "non-uniform" since the access time for data stored in a local memory (i.e., a memory resident in the same physical subsystem as a microprocessor) is often significantly shorter than for data stored in a remote memory (i.e., a memory resident in another physical subsystem).

Therefore, from a communication cost standpoint, performance is maximized in a NUMA computer by localizing data traffic within each physical subsystem, and minimizing the number of times data needs to be passed between physical subsystems.

Efficient utilization of the hardware resources in a computer often requires a collaborative effort between software and hardware. As noted above, from a software standpoint, much of the work performed by a computer is handled by various threads. To ensure optimal performance, threads are typically assigned to subsets of available computer resources in such a manner that the workload of the computer is evenly distributed among the available computer resources.

For efficient utilization of microprocessors, for example, it is desirable to evenly distribute threads among the available microprocessors to balance the workload of each individual microprocessor, a process referred to as "symmetric" resource allocation. However, given that communication cost can have a significant effect on system performance as well, it is also desirable to logically tie a thread with the data that it will use so that accesses to the data by the thread are localized whenever possible either in a cache, or if in a NUMA computer, at least within the same physical subsystem. Otherwise, the communication cost of accessing non-localized data may exceed the benefits of the symmetric distribution of threads. Typically, the tying of data with a thread requires human decisions to associate threads of a common type with physically localized memory, processors, and associated resources.

In a symmetric resource management scheme, threads are distributed at activation time, e.g., whenever threads are created or reactivated. Activated threads are typically assigned to the most available, or least loaded, resources or sets of resources. The non-uniform distribution of resources such as memory resources to address communication costs, however, is typically not implemented in such an automated and transparent manner. Rather, non-uniform resource management often requires substantial user analysis and custom configuration, including, for example, custom programming of computer programs to specifically address resource allocation issues.

Resource management is more desirably handled at the operating system or kernel level of a computer, and independent of any specific programming techniques applied to the applications or other computer programs that may be installed on a computer. In particular, resource management, when embedded in an operating system or kernel, requires no specific customization of a higher level computer program to support the optimal allocation of computer resources, and thus provides performance benefits to potentially all computer programs that are executing on a given computer. Particularly in NUMA computers, where performance benefits are achieved through the localization of thread-utilized resources within individual physical subsystems, it would be highly desirable to implement efficient resource allocation in a more transparent manner, and without requiring significant customization.

SUMMARY OF THE INVENTION

The invention addresses these and other problems associated with the prior art by providing an apparatus, program product and method in which threads are dynamically assigned to computer resources based upon specific "types" associated with such threads. In particular, thread types are allocated resources that are resident within the same physical subsystem in a computer, such that newly created threads and/or reactivated threads of those particular thread types are dynamically assigned to the resources allocated to their respective thread types. As such, those threads sharing the same type are generally assigned to computer resources that are resident within the same physical subsystem of a computer, and often in a substantially transparent manner, and without requiring any significant customization of the computer programs with which such threads are associated.

As will become more apparent below, any number of attributes or characteristics of threads may be utilized in classifying threads into various thread types. Among other possible distinctions, thread types may be defined based upon one or more of run priority, assignment to a buffer, user identity, user profile, memory subsystem, parent task, parent thread, parent job, parent application, and user authority.

In many instances, the herein-described assignment of threads will significantly reduce the need for resources within a particular physical subsystem to interact with other resources that are resident in other physical subsystems. Instead, communication traffic and processing overhead for a particular thread is more likely to be confined within a single physical subsystem, thus eliminating the overhead associated with inter-subsystem communications and maximizing system performance.

In some embodiments, the resources associated with a given thread type may be confined to a single physical subsystem. In other embodiments, however, a thread type may be allocated resources from multiple physical subsystems. In the latter embodiments, however, it still may be desirable to assign individual threads of a given thread type to those resources that are resident on only one of the physical subsystems for which resources have been allocated for that thread type.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter utilize a dynamic resource allocation mechanism that allocates resources to threads in a multithreaded computer of the type including multiple physical subsystems based at least in part on thread type. Consistent with the invention, whenever a particular thread type is associated with a particular set of resources, all subsequent threads that are activated and that match that thread type will be assigned to the same set of resources. Moreover, the sets of resources are typically constrained to individual physical subsystems to minimize cross traffic between multiple physical subsystems in a computer, and thus optimize overall system performance.

As such, in embodiments consistent with the invention, symmetric assignment of resources typically occurs only when a thread of a unique type is created; otherwise, asymmetric assignment occurs for threads that share the same thread type as other threads for which resources have previously been allocated. Similar to other non-uniform assignments of resources, grouping threads together by type typically will provide an advantage in terms of increasing the probability that the resources needed for a particular thread will be readily available without significant delays.

In the embodiments discussed hereinafter, typically the assignment of resources can be implemented relatively transparently in a computer system. Once rules are defined for typing a thread, the assignment of resources typically can often occur without explicit user management. This is in contrast with conventional NUMA architectures, which often require explicit configuration, customization and user analysis. This is also in contrast to conventional symmetric resource management schemes, where threads are typically assigned to the most available resources as of when the threads or created or reactivated, and irrespective of any particular affinity between multiple threads.

The discussion hereinafter will refer to the entities that are assigned to particular sets of resources as being "threads". It will be appreciated, however, that other terminology may be used to describe entities that define unique paths of execution in a computer system. As such, the term "thread" should be considered to correspond to any entity in a computer defining a particular execution path in a computer system.

A thread type within the context of the invention may include practically any attribute or other distinguishing characteristic of a thread, including, but not limited to, run priority, assignment to the same virtual or physical buffer or memory, user identify, parent logical subsystem, job, application, task or thread, assignment to same memory subsystem, name of initial program to be executed when thread started, thread authority, and user profile.

In addition, a set of resources may include any combination of computer resources such as processors, local caches, shared caches, shared memory, etc. In addition, computer resources may include other forms of resources, such as various input/output (I/O) resources. Typically, the resources that are suitable for assignment as sets via asymmetric affinities are located within specific and distinct physical subsystems of a computer, where a physical subsystem is generally considered to be a group of computer resources that are interact more efficiently with one another than when interacting with resources in other physical subsystems. In the embodiments discussed below, for example, physical subsystems are defined by groupings of hardware resources that are disposed in the same module, e.g., located on, directly accessed by, or otherwise controlled by, the same circuit card or multi-chip module (MCM). For example, in an eServer iSeries midrange computer system from International Business Machines, physical subsystems may include unique or distinct MCM's incorporating multiple processors and a shared memory, along with various levels (e.g., L1, L2 and/or L3) of intermediate shared and/or local caches. Furthermore, in some instances, the memory may be disposed on a separate card than the remainder of a physical subsystem, but nonetheless may be directly accessed using controllers resident on the MCM. In such an embodiment, communication between the resources on a given MCM is often significantly faster than communication between resources on different MCM's. As such, assignment of affiliated threads to resources disposed on a single MCM may minimize communication traffic between MCM's in favor of increased intra-MCM communication, and thus may optimize the overall performance of a computer system.

In the illustrated embodiments, threads are assigned to particular sets of resources whenever they are activated, e.g., whenever they are created (if new) and/or whenever they are reactivated (if existing, but currently inactive or dormant). However, the allocation of sets of resources to particular thread types may be performed at different points in time in different embodiments. In one embodiment, for example, the assignment of resources to a thread type may be performed in connection with activation of a thread of a type for which no resources have yet been allocated and/or for which additional resources are needed. In other embodiments, however, the assignment of resources to a thread type may be performed prior to activation of any thread of that type, e.g., in connection with startup of an application, startup of a logical subsystem, or in response to a specific program instruction to pre-allocate resources for a particular thread type. In this regard, a logical subsystem may include practically any collection of applications, jobs, threads or tasks that are logically related to one another.

Moreover, as will become more apparent below, in some embodiments a thread type may be allocated sets of computer resources that are associated with multiple physical subsystems in a computer system. For example, it may be desirable to allocate computer resources from multiple physical subsystems when a particular thread type is expected to require more resources than might be available in a given physical subsystem. Also, when the resources disposed in one physical subsystem are significantly underutilized, it may be desirable to permit multiple physical subsystems to share the load. Even in such instances, however, it may be desirable to define subtypes, or in the least, allocate specific threads of a given type to sets of resources that are only located on one physical subsystem (e.g., for a specific thread, assign that thread to the processors and memory located on a single MCM).

In still other embodiments, thread types may be allocated to a set of computer resources that includes only a subset of the available computer resources in a given physical subsystem.

Figure 1:
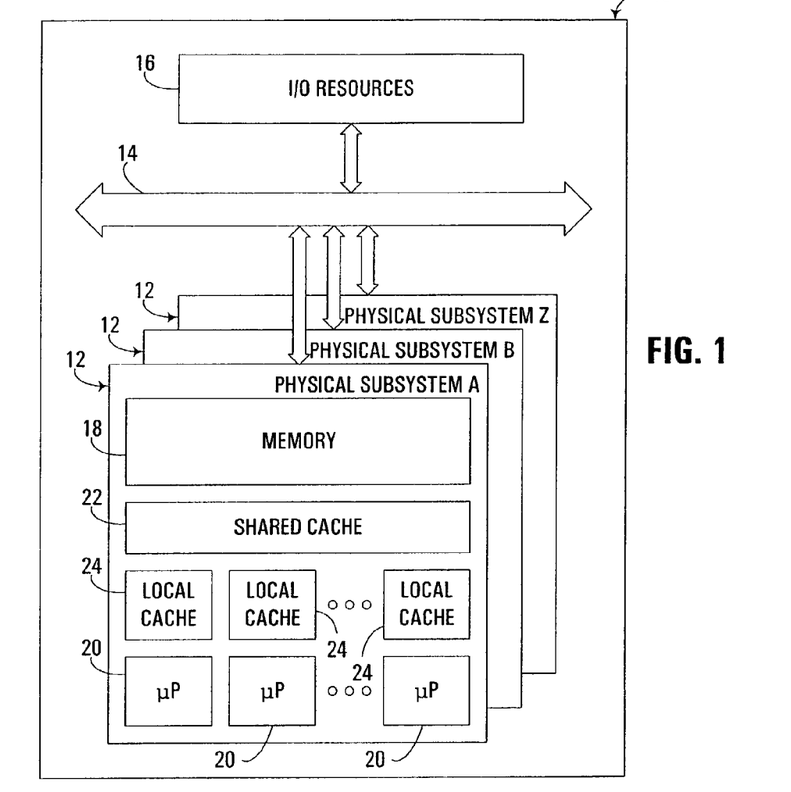
FIG. 1 is a block diagram of the principal hardware components in a multithreaded computer incorporating dynamic resource allocation consistent with the invention.

Turning now to the Drawings, wherein like numbers denote like parts throughout the several views, FIG. 1 illustrates the principal hardware components in a computer 10 incorporating dynamic resource allocation consistent with the invention. Computer 10 generically represents, for example, any of a number of multi-user computers such as a network server, a midrange computer, a mainframe computer, etc., e.g., an AS/400 or eServer iSeries midrange computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like).

Computer 10 generally includes multiple physical subsystems 12 connected to one another over a system bus or other communications interface. In addition, computer 10 typically includes various I/O resources generically illustrated at 16, including various types of resources such as storage devices, workstations, terminals, networks, imaging devices, etc.

Each physical subsystem 12 includes a set of computer resources, e.g., a shared memory 18, one or more microprocessors 20, and one or more levels of cache memory such as a shared cache 22 and one or more local caches 24. The resources 18–24 in each physical subsystem 12 are characterized by having the ability to interact or communicate more efficiently with one another than when interacting or communicating with the resources in other physical subsystems 12. For example, the resources in each physical subsystem 12 may be disposed on the same multi-chip module (MCM) or circuit card, whereby the interconnections between such resources may be an order of magnitude or more faster than the interconnects coupled to system bus 14.

Other physical partitioning of computer resources may be utilized in other embodiments of the invention. Moreover, other computer hardware architectures may utilize the dynamic resource allocation techniques discussed herein. Therefore, the invention is not limited to the specific hardware implementation illustrated in FIG. 1.

Figure 2:
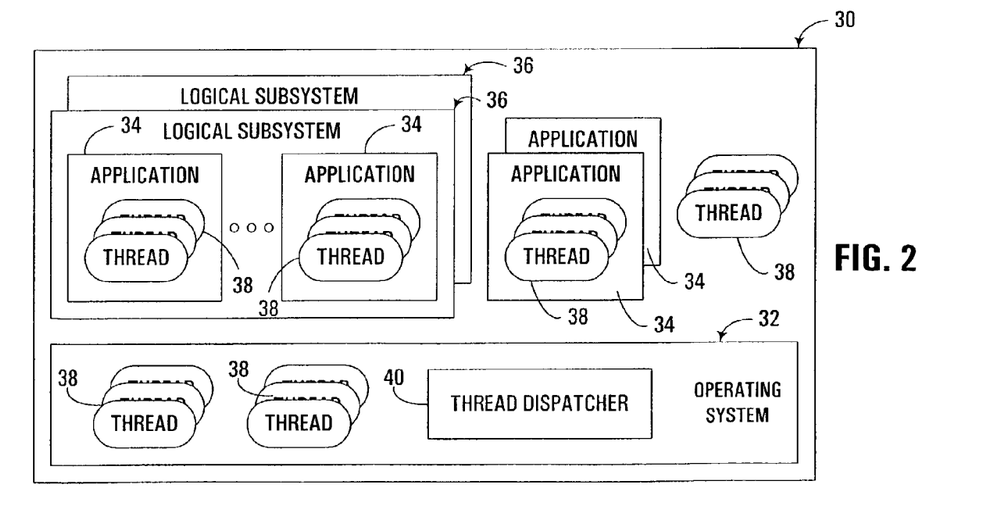
FIG. 2 is a block diagram of the principal software components in the multithreaded computer of FIG. 1.

FIG. 2 next illustrates an exemplary software architecture 30 capable of being utilized in computer 10 of FIG. 1. As shown, architecture 30 may rely upon an operating system 32 upon which executes a plurality of jobs or applications. In some embodiments, one or more applications may be associated within one another within a common logical subsystem 36, while other applications may not be associated with any particular logical subsystem.

As is shown in FIG. 2, computer 10, being a multithreaded computer, may execute or process a plurality of threads 38 to perform requested tasks on behalf of users. Threads 38 may be utilized within a number of contexts, including within operating system 32, within a particular application 34, within a particular logical subsystem 36, and/or elsewhere in architecture 30. In some architectures, multiple logical partitions may even be defined, whereby multiple logical partitions, including independently-executing operating systems, may be found within a given architecture. Threads 38 may therefore be logically resident practically anywhere in a given computer architecture.

The management of threads 38, including the allocation of resources to particular threads, is typically performed by a thread dispatcher 40, which is typically resident within operating system 32. In the aforementioned eServer iSeries implementation discussed above, for example, thread dispatcher 40 may be resident in the Licensed Internal Code (LIC) of such a computer. It will also be appreciated that a thread dispatcher may only manage a subset of the possible threads in a computer in some embodiments consistent with the invention.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Figure 3:
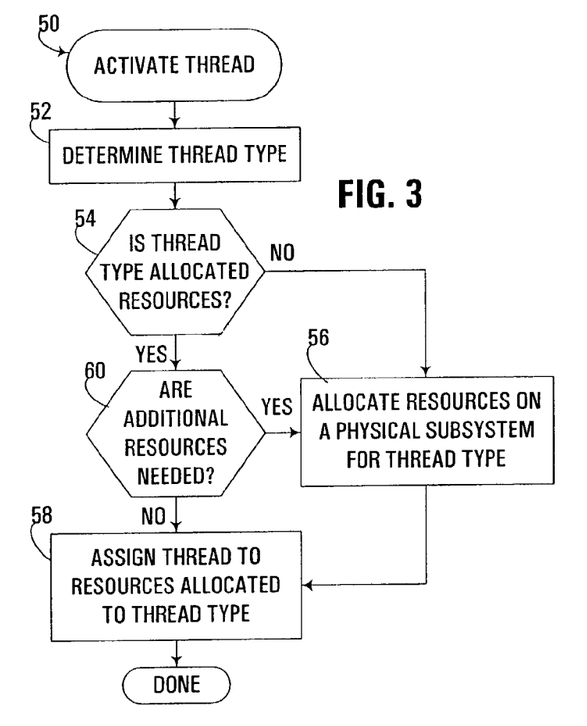
FIG. 3 is a flowchart illustrating the program flow of an activate thread routine executed by the thread dispatcher referenced in FIG. 2.

Now turning to a specific embodiment of the invention, FIG. 3 illustrates an exemplary activate thread routine 50 that may be executed by thread dispatcher 40 of FIG. 2 in response to a request to activate, e.g., create or reactivate, a thread. Routine 50 begins in block 52 by determining the thread type associated with the thread. As noted above, any number of characteristics or attributes of threads may be used to distinguish threads by type. The examples discussed below, for example, focus on thread types defined by a parent application or logical subsystem, such that all threads started on behalf of a particular application or logical subsystem will share the same type. In general, any characteristic or attribute of a thread that would result in comparatively better performance were threads of that type allocated a common set of resources, rather than to different sets of resources, may be used to classify threads consistent with the invention.

Once the thread type is determined, block 54 next determines whether the determined thread type has already been allocated a set of resources. Assuming first that no resources have been allocated to the determined thread type, block 54 would pass control to block 56 to assign a set of resources on a physical subsystem to the determined thread type, e.g., by symmetric assignment to a most available set of resources that are localized to a single or a known set of physical subsystems. For example, where different sets of resources are associated with different physical subsystems, block 56 may assign the resources for a most available physical subsystem to the determined thread type. Also, if it is not possible or practical to allocate resources on a single physical subsystem, the thread type can be transparently divided into multiple sub-types to associate a type with distinct sets of resources on multiple physical subsystems.

Once the resources are allocated to the thread type, block 58 next assigns the thread to be activated to the resources that have been allocated for the determined thread type. The thread is then activated in a conventional manner, and routine 50 is complete.

Returning to block 54, if resources have already been allocated for the determined thread type, block 56 may be bypassed, and control may pass directly to block 58 to assign the new thread to the previously-allocated resources for that thread type. In the alternative, as shown in FIG. 3, block 54 may pass control to block 60 to dynamically determine whether additional resources are needed for the thread type. For example, if the resources associated with a particular thread type have been fully utilized, it may be desirable to pass control to block 56 to allocate additional resources to the thread type (typically using resources disposed in the same physical subsystem, if possible). Otherwise, control may pass from block 60 to block 58. In other embodiments, however, no dynamic allocation of additional resources may be supported.

Using routine 50 of FIG. 3, it may be seen that resources are allocated for a thread type in connection with the activation of a thread having a type for which no resources have been previously allocated. However, as an alternative to the thread activation routine of FIG. 3, it may be desirable to pre-allocate computer resources for given thread types in an operation that is separate from thread activation. For example, on eServer iSeries computers, it is typical for user jobs to be assigned to a memory pool within a physical subsystem when such user jobs are initiated. Memory pools are typically assigned to logical subsystems, however, when the logical subsystems are initialized or started. Therefore, in one embodiment where multiple groupings of memory and processors are available in a computer (e.g., when physical subsystems are defined on multiple MCM's), it may be desirable to attempt to allocate all memory for a specific memory pool on a single MCM or physical subsystem whenever possible, and at the time a logical subsystem is initialized or started. Moreover, if a pool is too large, then sub-pools may be defined and located on individual MCM's, but in such a manner that is generally transparent to users. It is envisioned that a thread dispatcher may be configured consistent with the invention to impart, to jobs running in an associated subsystem or memory pool, a high affinity to those processors that are associated with the subsystem or memory pool.

Figure 4:
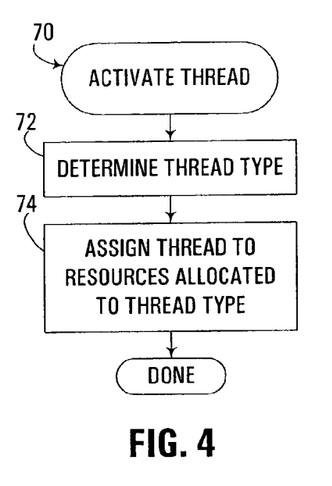
FIG. 4 is a flowchart illustrating the program flow of an alternate activate thread routine executed by the thread dispatcher referenced in FIG. 2.
Figure 5:
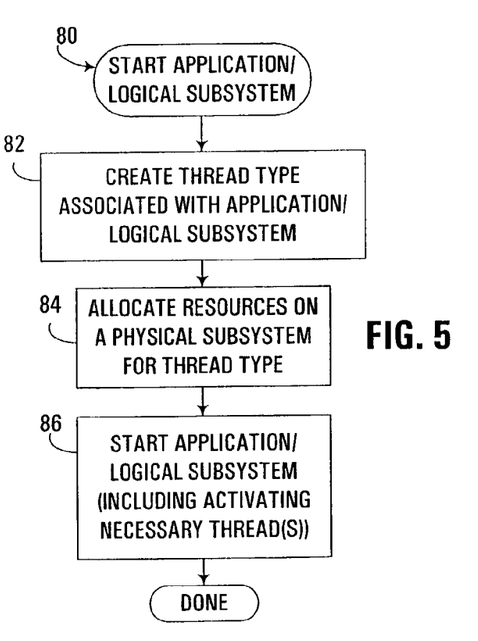
FIG. 5 is a flowchart illustrating the program flow of a start application/logical subsystem routine executed by the operating system referenced in FIG. 2, and utilized in connection with the activate thread routine of FIG. 4.

FIGS. 4 and 5, for example, illustrate an alternate embodiment where allocation of resources to thread types is performed in connection with the starting of a parent application or logical subsystem. As shown in FIG. 4, an activate thread routine 70 in this embodiment may execute by determining a thread type in block 72, similar to the process performed in block 52 of FIG. 3. Once the thread type is determined, however, it is presumed that resources have already been allocated for the determined thread type. As such, control may pass directly to block 74 to assign the new thread to the resources that have already been allocated to that thread type. Routine 70 would then been complete. It should also be appreciated that, in this alternate embodiment, checking for the need for additional resources may also be performed if desired.

As shown in FIG. 5, a start application/logical subsystem routine 80 may be executed whenever a request is received to start an application or logical subsystem. Routine 80 begins in block 82 by creating a thread type associated with the application or logical subsystem being started. Next, block 84 allocates resources on a physical subsystem for the newly-created thread type, e.g., using symmetric assignment, and typically using resources disposed in a single physical subsystem. As noted above, if it is not possible or practical to allocate resources on a single physical subsystem, the thread type can be transparently divided into multiple sub-types to associate a type with distinct sets of resources on multiple physical subsystems.

Next, block 86 starts the requested application or logical subsystem, activating any threads as desired, and routine 80 is complete. It will be appreciated that, for any thread activated in block 86, routine 70 will typically be called to activate that thread as described above in connection with FIG. 4.

Figure 6A:
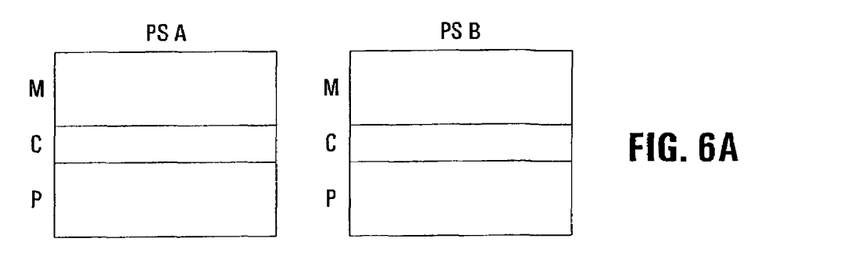
FIGS. 6A–6D are block diagrams illustrating an exemplary allocation of computer resources between two physical subsystems of a multithreaded computer in a manner consistent with the invention.

A practical example of one manner of implementing the invention is described below in connection with FIGS. 6A–6D. Suppose a computer has two physical subsystems, e.g., processor cards or MCM's, each containing multiple processors and a quantity of memory. The memory of each physical subsystem is accessible to all processors, but access to the memory is fastest when the information is retrieved from the same physical subsystem as the requesting processor. Consequently, it would be beneficial if the majority of the memory accesses for each processor could be localized. The resource group, in this case, is the card with associated processors, caches and memory. The two physical subsystems are illustrated in FIG. 6A as PS A and PS B, with the resource group for each being represented by processor (P), cache (C), and memory (M) resources.

Figure 6B:
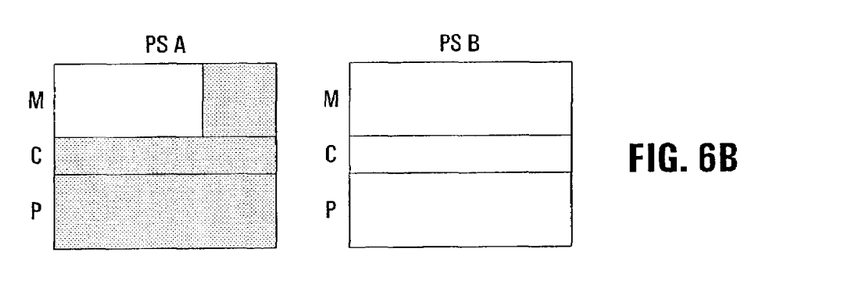

Now turning to FIG. 6B, suppose a logical subsystem is initiated to support a first, Accounts Receivable application that will have fifty threads running. Because all fifty threads are "typed" as similar, consistent with the invention such threads may all be assigned to the first physical subsystem PS A. As represented by the shading applied to the resources in PS A of FIG. 6B, typically all of the processors and caches in the physical subsystem will be available for use by the threads in the Accounts Receivable application. Moreover, typically a memory pool, representing a subset of the available memory in the physical subsystem, is also available for use by such threads.

In should be appreciated, however, that in some embodiments, the threads in the Accounts Receivable application may not always be assigned solely to the first physical subsystem. In particular, it should be recognized that situations may exist that make it desirable to extend a thread or application's utilization beyond its assigned resources, e.g., if the Accounts Receivable application was the only application executing on the system. The concept of "affinity" between threads and their resources often dictates that assignment rules are not always set in stone, but may vary from time to time if a particular situation warrants.

Figure 6C:
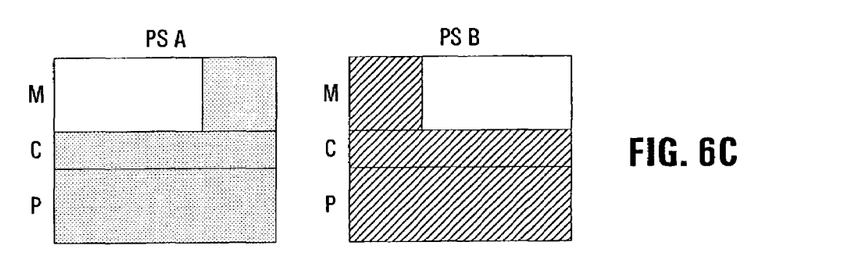

Now turning to FIG. 6C, assume that a second, Inventory Control application is started in a separate logical subsystem. Threads in this application are considered for the purposes of this example to have a separate "type" from the threads associated with the Accounts Receivable application (by virtue of their residency in a separate logical subsystem). As such, symmetric assignment may be used to assign these threads to the least used set of resources (in this case, the second physical subsystem PS B), resulting in the allocation of the processor and cache resources, as well as a memory pool, as illustrated by the additional shading depicted in FIG. 6C.

Figure 6D:
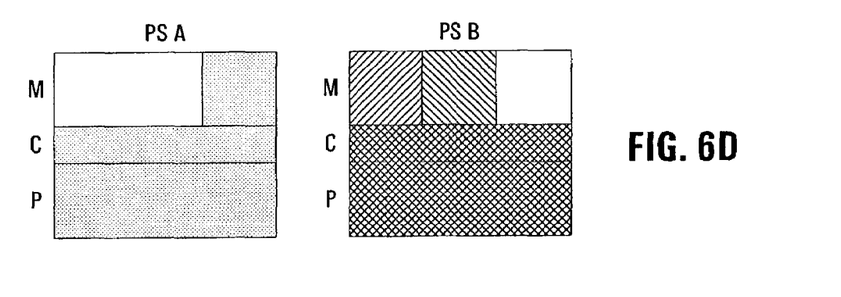

Next, turning to FIG. 6D, assume a third, Customer Information application is initiated, the threads associated with this application's type will be assigned to whichever processor/memory group is least active. For the purposes of this example, assume that the second physical subsystem is the least active. As shown by the additional shading in FIG. 6D, the processor and cache resources are allocated for use with the thread types affiliated with both the Inventory Control and Customer Information applications. Typically, however, separate memory pools, resident in the same physical subsystem, are maintained for each thread type.

Note that, although resources may not be used evenly in a global sense, the individual threads will tend to operate more efficiently even on the resources with higher utilization, because they will have efficient access to data that is being processed by their thread "type." When, at the end of the day, the Accounts Receivable application activity is significantly reduced and a Payroll application is initiated, the transparent, automatic assignment of the Payroll "type" will go to the most available resource, which is probably the one that was previously heavily used by the Accounts Receivable application. However, on the occasion that a substantial amount of extra Accounts Receivable work is needed so that activity in the application does not drop prior to the start of the Payroll application, the automatic assignment may choose the other processor/memory resource group without any operator or systems manager intervention.

Figure 7:
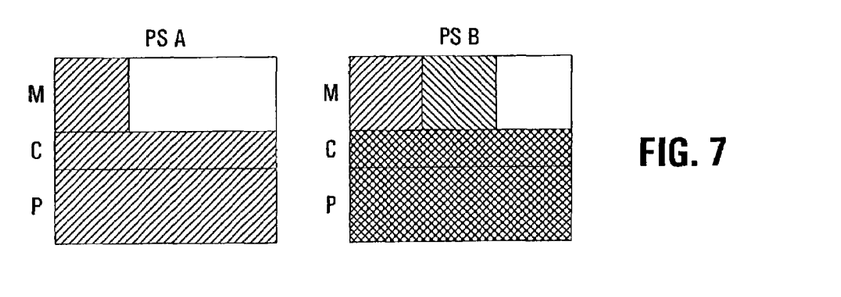
FIG. 7 is a block diagram illustrating another exemplary allocation of computer resources between two physical subsystems of a multithreaded computer in a manner consistent with the invention, illustrating the allocation of computer resources from more than one physical subsystem to a particular thread type.

FIG. 7 next illustrates a similar example to that discussed in connection with FIGS. 6A–6D. In the example of FIG. 7, however, a first thread type is allocated resources from both physical subsystems, while a second thread type is allocated resources from only one physical subsystem. For example, it may be the case that an Accounts Receivable application requires more resources than can be provided by a single physical subsystem, while an Inventory Control application has comparatively lower resource requirements. It will be appreciated that, while the Accounts Receivable thread type is allocated resources from multiple physical subsystems, individual threads of that type will be transparently divided into "sub-types", which will typically be assigned to resources from only one physical subsystem, thus tending to maintain resource locality on a thread-by-thread basis. New threads of the base type may be assigned to a particular sub-type based upon overall availability of the various physical subsystems that are assigned to the same base type. This availability may be based upon different factors, including, for example, thread count, processor utilization, and/or memory utilization.

Other modifications will be apparent to one of ordinary skill in the art having the benefit of the instant disclosure. Therefore, the invention lies in the claims hereinafter appended.

What is claimed is:

1. A method of dynamically allocating computer resources in a multithreaded computer including a plurality of distinct physical subsystems, the method comprising:
    (a) for each thread type among a plurality of thread types, associating with such thread type a set of computer resources that are physically located within a common physical subsystem in the multithreaded computer; and
    (b) in response to a request to activate a thread, assigning the thread to the set of computer resources that are associated with the thread type of the thread;
wherein the plurality of thread types are distinguished based upon a characteristic selected from the group consisting of run priority, assignment to a buffer, user identity, user profile, memory subsystem, parent task, parent thread, parent job, parent application, parent logical subsystem, user authority, and combinations thereof.

2. The method of claim 1, wherein associating the set of computer resources for a first thread type among the plurality of thread types is performed in response to a request to activate a thread having the first thread type when no computer resources are associated with the first thread type.

3. The method of claim 1, wherein associating the set of computer resources for a first thread type among the plurality of thread types is performed prior to receiving a request to activate a thread having the first thread type.

4. The method of claim 3, wherein associating the set of computer resources for the first thread type among the plurality of thread types is performed in response to a request to pre-allocate resources for the first thread type.

5. The method of claim 3, wherein associating the set of computer resources for the first thread type among the plurality of thread types is performed in response to a request to start a logical subsystem in the multithreaded computer.

6. The method of claim 1, wherein each physical subsystem includes a memory and at least one processor.

7. The method of claim 6, wherein each physical subsystem includes multiple processors, wherein at least a portion of the memory is shared by the multiple processors.

8. The method of claim 6, wherein each physical subsystem further includes a cache.

9. The method of claim 6, wherein each physical subsystem includes a unique multi-chip module (MCM).

10. The method of claim 1, wherein a first thread type among the plurality of thread types is associated with a first set of computer resources physically located within a first physical subsystem among the plurality of physical subsystems, the method further comprising:
    (a) associating with the first thread type a second set of computer resources that are physically located within a different physical subsystem in the multithreaded computer from the first physical subsystem; and
    (b) in response to a request to activate a thread of the first thread type, assigning such thread to one of the first and second sets of computer resources associated with the first thread type.

11. The method of claim 1, wherein at least two of the sets of computer resources include processors resident on different physical subsystems, wherein the thread is of a type that is capable of being executed on the processor of either of the two sets of computer resources, and wherein assigning the thread to the set of computer resources that are associated with the thread type of the thread results in execution of the thread on the processor of one of the two sets of computer resources.

12. A method of dynamically allocating computer resources in a multithreaded computer including a plurality of distinct physical subsystems, the method comprising:
    (a) for a first thread type among a plurality of thread types, associating with such first thread type first and second sets of computer resources that are physically located within first and second physical subsystems in the multithreaded computer, respectively;
    (b) in response to a request to activate a first thread of the first thread type, assigning the first thread to the first set of computer resources such that the first thread utilizes resources in the first set of computer resources during execution of the first thread; and
    (c) in response to a request to activate a second thread of the first thread type, assigning the second thread to the second set of computer resources such that the second thread utilizes resources in the second set of computer resources during execution of the second thread.

13. An apparatus, comprising:
    (a) a multithreaded computer including a plurality of distinct physical subsystems; and
    (b) program code resident on the multithreaded computer and configured to, for each thread type among a plurality of thread types, associate with such thread type a set of computer resources that are physically located within a common physical subsystem in the multithreaded computer; and, in response to a request to activate a thread, assign the thread to the set of computer resources that are associated with the thread type of the thread;
wherein the plurality of thread types are distinguished based upon a characteristic selected from the group consisting of run priority, assignment to a buffer, user identity, user profile, memory subsystem, parent task, parent thread, parent job, parent application, parent logical subsystem, user authority, and combinations thereof.

14. The apparatus of claim 13, wherein the program code is configured to associate the set of computer resources for a first thread type among the plurality of thread types in response to a request to activate a thread having the first thread type when no computer resources are associated with the first thread type.

15. The apparatus of claim 13, wherein the program code is configured to associate the set of computer resources for a first thread type among the plurality of thread types prior to receiving a request to activate a thread having the first thread type.

16. The apparatus of claim 15, wherein the program code is configured to associate the set of computer resources for the first thread type among the plurality of thread types in response to a request to pre-allocate resources for the first thread type.

17. The apparatus of claim 15, wherein the program code is configured to associate the set of computer resources for the first thread type among the plurality of thread types in response to a request to start a logical subsystem in the multithreaded computer.

18. The apparatus of claim 13, wherein each physical subsystem includes a memory and at least one processor.

19. The apparatus of claim 18, wherein each physical subsystem includes multiple processors, wherein at least a portion of the memory is shared by the multiple processors.

20. The apparatus of claim 18, wherein each physical subsystem further includes a cache.

21. The apparatus of claim 18, wherein each physical subsystem includes a unique multi-chip module (MCM).

22. The apparatus of claim 13, wherein a first thread type among the plurality of thread types is associated with a first set of computer resources physically located within a first physical subsystem among the plurality of physical subsystems, the program code further configured to associate with the first thread type a second set of computer resources that are physically located within a different physical subsystem in the multithreaded computer from the first physical subsystem; and, in response to a request to activate a thread of the first thread type, assign such thread to one of the first and second sets of computer resources associated with the first thread type.

23. A program product, comprising:
(a) program code resident on a multithreaded computer of the type including a plurality of distinct physical subsystems, the program code configured to, for each thread type among a plurality of thread types, associate with such thread type a set of computer resources that are physically located within a common physical subsystem in the multithreaded computer; and, in response to a request to activate a thread, assign the thread to the set of computer resources that are associated with the thread type of the thread; and
(b) a recordable computer readable medium bearing the program code;

wherein the plurality of thread types are distinguished based upon a characteristic selected from the group consisting of run priority, assignment to a buffer, user identity, user profile, memory subsystem, parent task, parent thread, parent job, parent application, parent logical subsystem, user authority, and combinations thereof.

24. An apparatus, comprising:
(a) a multithreaded computer including a plurality of distinct physical subsystems; and
(b) program code resident on the multithreaded computer and configured to, for each thread type among a plurality of thread types, associate with such thread type a set of computer resources that are physically tocated within a common physical subsystem in the multithreaded computer; and, in response to a request to activate a thread, assign the thread to the set of computer resources that are associated with the thread type of the thread;

wherein a first thread type among the plurality of thread types is associated with a first set of computer resources physically located within a first physical subsystem among the plurality of physical subsystems, the program code further configured to associate with the first thread type a second set of computer resources that are physically located within a different physical subsystem in the multithreaded computer from the first physical subsystem; and, in response to a request to activate a thread of the first thread type, assign such thread to one of the first and second sets of computer resources associated with the first thread type.

* * * * *